(12) United States Patent
Pan et al.

(10) Patent No.: US 11,102,405 B2
(45) Date of Patent: *Aug. 24, 2021

(54) REAR-STITCHED VIEW PANORAMA FOR REAR-VIEW VISUALIZATION

(71) Applicant: Texas Instruments Incorporated, Dallas, TX (US)

(72) Inventors: Janice Shuay-Ann Pan, Houston, TX (US); Vikram VijayanBabu Appia, Dallas, TX (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,539

(22) Filed: Apr. 27, 2020

(65) Prior Publication Data

US 2020/0260006 A1 Aug. 13, 2020

Related U.S. Application Data

(63) Continuation of application No. 16/387,817, filed on Apr. 18, 2019, now Pat. No. 10,674,079, which is a (Continued)

(51) Int. Cl.
*H04N 5/232* (2006.01)
*B60R 1/00* (2006.01)
(Continued)

(52) U.S. Cl.
CPC ........... *H04N 5/23238* (2013.01); *B60R 1/00* (2013.01); *H04N 7/181* (2013.01); *H04N 13/111* (2018.05);
(Continued)

(58) Field of Classification Search
CPC ............. H04N 5/23238; H04N 13/128; H04N 13/246; H04N 13/271; H04N 13/239;
(Continued)

(56) References Cited

U.S. PATENT DOCUMENTS 5,289,321 A 2/1994 Secor
5,670,935 A 9/1997 Schofield
(Continued)

OTHER PUBLICATIONS

Aseem Agarwala et al, "Interactive Digital Photomontage", ACM Transactions on Graphics, vol. 23, Edition 3, Aug. 9-12, 2004, pp. 294-302.
(Continued)

*Primary Examiner* — John R Schnurr
(74) *Attorney, Agent, or Firm* — Brian D. Graham; Charles A. Brill; Frank D. Cimino

(57) ABSTRACT

A rear-stitched view panorama (RSVP) system is provided that includes at least one processor and a memory storing software instructions that, when executed by the least one processor, cause the RSVP system to compute a disparity map for a left center rear image and a right center rear image captured by a stereo camera mounted on a rear of a vehicle, transform a right rear image, a left rear image, a reference center rear image, and the disparity map to a virtual world view, the right rear image and left rear image captured by respective right and left cameras mounted on the vehicle, compute an optimal left seam and an optimal right seam based on the transformed disparity map, and stitch the transformed images based on respective optimal seams to generate a panorama.

20 Claims, 12 Drawing Sheets

Related U.S. Application Data continuation of application No. 15/661,844, filed on Jul. 27, 2017, now Pat. No. 10,313,584.

(60) Provisional application No. 62/442,315, filed on Jan. 4, 2017.

(51) Int. Cl.
| | | |
|---|---|---|
| *H04N 13/111* | (2018.01) | |
| *H04N 13/128* | (2018.01) | |
| *H04N 13/271* | (2018.01) | |
| *H04N 7/18* | (2006.01) | |
| *H04N 13/246* | (2018.01) | |
| *H04N 13/239* | (2018.01) | |
| *H04N 5/445* | (2011.01) | |

(52) U.S. Cl.
CPC ......... *H04N 13/128* (2018.05); *H04N 13/239* (2018.05); *H04N 13/246* (2018.05); *H04N 13/271* (2018.05); *B60R 2300/105* (2013.01); *B60R 2300/107* (2013.01); *B60R 2300/303* (2013.01); *B60R 2300/8046* (2013.01); *B60R 2300/8066* (2013.01); *H04N 5/44504* (2013.01)

(58) Field of Classification Search
CPC .. H04N 13/111; H04N 7/181; H04N 5/44504; B60R 1/00; B60R 2300/105; B60R 2300/107; B60R 2300/303; B60R 2300/8046; B60R 2300/8066
See application file for complete search history.

(56) References Cited

U.S. PATENT DOCUMENTS

| | | | |
|---|---|---|---|
| 6,717,610 | B1 | 4/2004 | Bos |
| 7,307,655 | B1 | 12/2007 | Okamoto |
| 9,533,618 | B2 | 1/2017 | Zhang |
| 2008/0044061 | A1 | 2/2008 | Hongo |
| 2011/0032357 | A1 | 2/2011 | Kitaura |
| 2011/0115615 | A1 | 5/2011 | Luo |
| 2012/0069184 | A1 | 3/2012 | Hottmann |
| 2012/0092498 | A1 | 4/2012 | Kanning |
| 2014/0009569 | A1 | 1/2014 | Chen |
| 2014/0055616 | A1 | 2/2014 | Cocoran |
| 2014/0114534 | A1 | 4/2014 | Zhang |
| 2014/0152774 | A1 | 6/2014 | Wakabayashi |
| 2015/0022664 | A1 | 1/2015 | Pflug |
| 2015/0296140 | A1 | 10/2015 | Kim |
| 2015/0296202 | A1 | 10/2015 | Zhong |
| 2016/0044284 | A1 | 2/2016 | Goseberg |
| 2016/0148062 | A1 | 5/2016 | Fursich |
| 2016/0165211 | A1 | 6/2016 | Balasubramanian |
| 2016/0309827 | A1 | 10/2016 | Dodson |
| 2017/0091559 | A1 | 3/2017 | Hurtado |
| 2017/0124710 | A1 | 5/2017 | Kwon |
| 2017/0251198 | A1 | 8/2017 | Nobori |
| 2018/0054609 | A1 | 2/2018 | Park |
| 2018/0330509 | A1 | 11/2018 | Watanabe |

OTHER PUBLICATIONS

Mohamed El Ansari et al, "Temporal Consistent Fast Stereo Matching for Advanced Driver Assistance Systems (ADAS)", 2010 IEEE Intelligent Vehicles Symposium, San Diego, CA, Jun. 21-24, 2010, pp. 825-831.
M. Bertozzi et al , "Stereo Vision-based Vehicle Detection", Proceedings of the IEEE Intelligent Vehicles Symposium 2000, Dearborn, Michigan, Oct. 3-5, 2000,pp. 39-44.
Massimo Bertozzi and Alberto Broggi, "GOLD: A Parallel Real-Time Stereo Vision System for Generic Obstacle and Lane Detection", IEEE Transactions on Image Processing, vol. 7, No. 1, Jan. 1998, pp. 62-81.
Yuri Boykov et al, "Fast Approximate Energy Minimization via Graph Cuts", IEEE Transactions on Pattern Analysis and Machine Intelligence, vol. 23, No. 11, Nov. 2001, pp. 1222-1239.
Wayne Cunningham, "BMW ditches mirrors for a safer side-view camera system", CNET, available at https://www.cnet.com/news/bmw-ditches-mirrors-for-a-safer-side-view-camera-system on Jul. 5, 2017, Jan. 5, 2016, pp. 1-6.
James Davis, "Mosaics of Scenes with Moving Objects", 1998 IEEE Computer Society Conference on Computer Vision and Pattern Recognition, Jun. 25, 1998, pp. 1-7.
A. de la Escalera et al, "Traffic Sign Recognition and Analysis for Intelligent Vehicles", Image and Vision Computing, vol. 21, Issue 3, Mar. 1, 2003, pp. 247-258.
J. Franke et al, "Autonomous Driving approaches Downtown", IEEE Intelligent Systems and Their Applications, vol. 13, No. 6, Nov./Dec. 1999, pp. 1-14.
Jannik Fritsch et al, "A New Performance Measure and Evaluation Benchmark for Road Detection Algorithms", 16th International IEEE Conference on Intelligent Transportation Systems (ITSC), Oct. 6-9, 2013, The Hague, Netherlands, pp. 1-8.
X. W. Gao et al, "Recognition of Traffic Signs Based on their Colour and Shape Features Extracted using Human Vision Models", Journal of Visual Communication and Image Representation, vol. 17, Issue 4, Aug. 2006, pp. 675-685.
David Geronimo et al, "Survey of Pedestrian Detection for Advanced Driver Assistance Systems", IEEE Transactions on Pattern Analysis and Machine Intelligence, vol. 32, No. 7, Jul. 2010, pp. 1239-1258.
Kenneth Levenberg, "A Method for the Solution of Certain Non-Linear Problems in Least Squares", Quarterly Journal of Applied Mathematics, vol. II, No. 2, 1944, pp. 164-168.
Yu-Chih Liu et al, "Bird's-Eye View Vision System for Vehicle Surrounding Monitoring", Proceedings of the 2nd International Conference on Robot Vision, Auckland, New Zealand, Feb. 18-20, 2008, pp. 207-218.
Donald W. Marquardt, "An Algorithm for Least-Squares Estimation of Nonlinear Parameters", Journal of the Society for Industrial and Applied Mathematics, vol. 11, No. 2, Jun. 1963, pp. 431-441.
Mihir Mody et al, "High Performance Front Camera ADAS Applications on Ti's TDA3X Platform", IEEE 22nd International Conference on High Performance Computing (HiPC), Dec. 16-19, 2015, Bangalore, India, pp. 1-8.
Andreas Mogelmose et al, "Vision-Based Traffic Sign Detection and Analysis for Intelligent Driver Assistance Systems: Perspectives and Survey", IEEE Transactions on Intelligent Transportation Systems, vol. 13, No. 4, Dec. 2012, pp. 1484-1497.
Sergiu Nedevschi et al, "Stereo Image Processing for ADAS and Pre-Crash Systems", Proceedings of the 5th International Workshop on Intelligent Transportation (WIT 2008), Mar. 18-19, 2008, Hamburg, Germany, pp. 55-60.
Marcos Nieto et al, "Real-Time Lane Tracking using Rao-Blackwellized Particle Filter", Journal of Real-Time Image Processing, Dec. 27, 2012, pp. 1-13.
Florin Oniga and Sergiu Nedevschi, "Processing Dense Stereo Data Using Elevation Maps: Road Surface, Traffic Isle, and Obstacle Detection", IEEE Transactions on Vehicular Technology, vol. 59, No. 3, Mar. 2010, pp. 1172-1182.
Janice Pan et al, "Virtual Top-View Camera Calibration for Accurate Object Representation", 2016 IEEE Southwest Symposium on Image Analysis and Interpretation (SSIAI), Mar. 6-8, 2016, Santa Fe, NM, pp. 21-24.
Cosmin D. Pantilie et al, "Real-time Obstacle Detection Using Dense Stereo Vision and Dense Optical Flow", 2010 IEEE International Conference on Intelligent Computer Communication and Processing (ICCP), Aug. 26-28, 2010, Cluj-Napoca, Romania, pp. 191-196.
D. V. Papadimitriou and T. J. Dennis, "Epipolar Line Estimation and Rectification for Stereo Image Pairs", IEEE Transactions in Image Processing, vol. 5, No. 4, Apr. 1996, pp. 672-676.

(56) References Cited

OTHER PUBLICATIONS

David Pfeiffer and Uwe Franke, "Efficient Representation of Traffic Scenes by Means of Dynamic Stixels", 2010 IEEE Intelligent Vehicles Symposium (IV), Jun. 21-24, 2010, San Diego, CA, pp. 217-224.

G. Piccioli et al, "Robust Method for Road Sign Detection and Recognition", Image and Vision Computing, vol. 14, Issue 3, Apr. 1996, pp. 209-223.

Alfredo Ramirez et al, "Panoramic Stitching for Driver Assistance and Applications to Motion Saliency-Based Risk Analysis", Proceedings of the 16th International IEEE Annual Conference on Intelligent Transportation Systems (ITSC 2013), Oct. 6-9, 2013, The Hague, The Netherlands, pp. 597-601.

Andrzej Ruta et al, "Real-time Traffic Sign Recognition from Video by Class-specific Discriminative Features", Pattern Recognition, vol. 43, Issue 1, Jan. 2010, pp. 416-430.

S. Singh, "Critical Reasons for Crashes Investigated in the National Motor Vehicle Crash Causation Survey", Traffic Safety Facts Crash*Stats. Report No. DOT HS 812 115, U.S. Department of Transportation National Highway Traffic Safety Administration, Feb. 2015, pp. 1-2.

"TDA3x SoC Processors for Advanced Driver Assist Systems (ADAS) Technical Brief", Texas Instruments, Inc., SPRT704A, Oct. 2014, pp. 1-6.

Prahanth Viswanath et al, "A Diverse High-Performance Platform for Advanced Driver Assistance System (ADAS) Applications", Texas Instruments, Inc., Oct. 2016, pp. 1-16.

Matthew Uyttendaele et al, "Eliminating Ghosting and Exposure Artifacts in Image Mosaics", Proceedings of the 2001 IEEE Computer Society Conference on Computer Vision and Pattern Recognition, Dec. 8-14, 2001, Kauai, Hawaii, pp. 11-509-11-516.

Hunjae Yoo et al, "Gradient-Enhancing Conversion for Illumination-Robust Lane Detection", IEEE Transactions on Intelligent Transportation Systems, vol. 14, No. 3, Sep. 2013, pp. 1083-1094.

Fan Zhang and Feng Liu, "Parallax-tolerant Image Stitching", 2014 IEEE Conference on Computer Vision and Pattern Recognition (CVPR), Columbus, OH, Jun. 23-28, 2014, pp. 3262-3269.

Chen, et al., "View Interpolation for Image Synthesis," Proceedings of the 20th Annual Conference on Computer Graphics and Interactive Techniques, SIGGRAPH '93, Apple Computer, 1993, pp. 279-288.

REAR-STITCHED VIEW PANORAMA FOR REAR-VIEW VISUALIZATION

CROSS-REFERENCE TO RELATED APPLICATIONS

This application is a continuation of U.S. Non-Provisional application Ser. No. 16/387,817 filed Apr. 18, 2019, which is a continuation of U.S. Non-Provisional Ser. No. 15/661,844 filed Jul. 27, 2017, which claims benefit of U.S. Provisional Patent Application Ser. No. 62/442,315, filed Jan. 4, 2017, which applications are hereby incorporated herein by reference in their entireties.

BACKGROUND OF THE DISCLOSURE

Field of the Disclosure

Embodiments of the present disclosure generally relate to rear-view visualization in a vehicle.

Description of the Related Art

In most current vehicles, the field of view (FOV) available on the sides and behind the vehicle available to drivers is limited to what can be seen in side-view and rear-view mirrors. This three-mirror system, however, imposes safety concerns because a driver is required to shift attention to look in each mirror to obtain a full visualization of the rear-view FOV, which takes attention off the scene in front of the vehicle. Camera monitoring systems (CMS) are becoming increasingly available, but such systems typically simply replace the mirrors with cameras, thereby still requiring drivers to shift attention between displays before mentally piecing together an aggregated view of the entire rear FOV. Further, when the angles of the side mirrors/cameras are adjusted to typical positions that include the sides of the vehicle, blind spots remain just outside the side FOVs, posing an additional safety hazard as the driver has to look over a shoulder to check these blind spots.

SUMMARY

Embodiments of the present disclosure relate to generating a panorama of a rear view of a vehicle. In one aspect, a rear-stitched view panorama (RSVP) system is provided that includes at least one processor, and a memory storing software instructions that, when executed by at the at least one processor, cause the RSVP system to compute a disparity map for a left center rear image and a right center rear image, the left center rear image and the right center rear image captured by a stereo camera mounted on a rear of a vehicle, transform a right rear image, a left rear image, a reference center rear image of the left center rear image and the right center rear image, and the disparity map to a virtual world view using virtual camera parameters, the right rear image captured by a right camera mounted on a right side of the vehicle and the left rear image captured by a left camera mounted on a left side of the vehicle, compute an optimal left seam between the transformed left rear image and the transformed reference center rear image based on the transformed disparity map, compute an optimal right seam between the transformed right rear image and the transformed reference center rear image based on the transformed disparity map, and stitch the transformed left rear image and the transformed reference center rear image based on the optimal left seam and the transformed right rear image and the transformed reference center rear image based on the optimal right seam to generate a panorama.

In one aspect, a method for generating a rear-stitched view panorama is provided that includes computing a disparity map for a left center rear image and a right center rear image, the left center rear image captured by a stereo camera mounted on a rear of a vehicle, transforming a right rear image, a left rear image, a reference center rear image of one of the left center rear image and the right center rear image, and the disparity map to a virtual world view using virtual camera parameters, the right rear image captured by a right camera mounted on a right side of the vehicle and the left rear image captured by a left camera mounted on a left side of the vehicle, computing an optimal left seam between the transformed left rear image and the transformed reference center rear image based on the transformed disparity map, computing an optimal right seam between the transformed right rear image and the transformed reference center rear image based on the transformed disparity map, and stitching the transformed left rear image and the transformed reference center rear image based on the optimal left seam and the transformed right rear image and the transformed reference center rear image based on the optimal right seam to generate a panorama.

BRIEF DESCRIPTION OF THE DRAWINGS

Particular embodiments in accordance with the disclosure will now be described, by way of example, and with reference to the accompanying drawings.

DETAILED DESCRIPTION OF EMBODIMENTS

Figure 1:
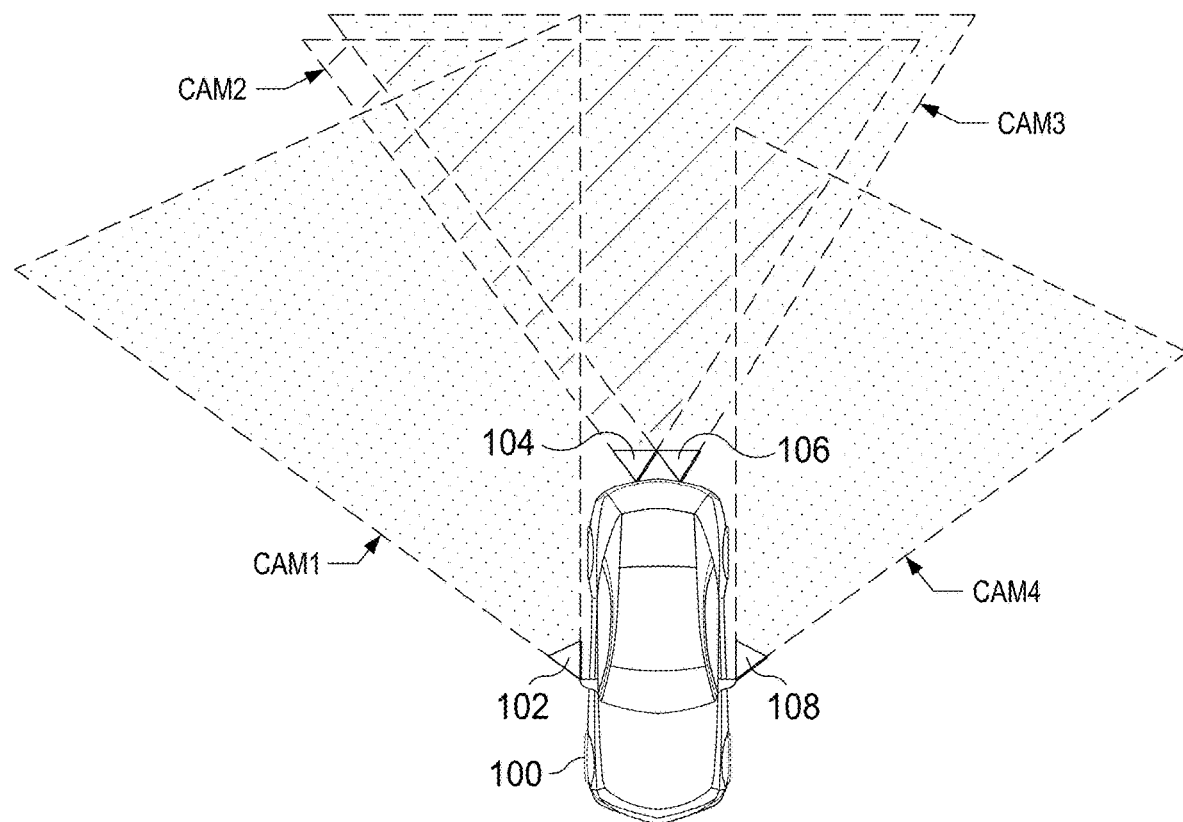
FIG. 1 is a top-down view of an example vehicle that includes a rear-stitched view panorama (RSVP) system.

Specific embodiments of the disclosure will now be described in detail with reference to the accompanying figures. Like elements in the various figures are denoted by like reference numerals for consistency.

Embodiments of the disclosure provide single rear-view stitched panoramas of the rear field of view (FOV) of a vehicle that is at least the FOV that the typical trio of mirrors can provide. The panoramas may be presented to a driver of a vehicle on a single display, thus eliminating the need for the driver to shift attention between three mirrors. Four cameras are used: one on each side of the vehicle to replace the typical exterior side mounted mirrors and a stereo pair of cameras on the rear of the vehicle to replace the typical center interior rear view mirror. The side cameras may be positioned to reduce the extent of the typical blind spots caused by typical side mirror positioning. Images from the two side cameras are fused or stitched with images from a reference camera of the stereo pair to generate seamless panoramas of the rear FOV of the vehicle.

In order to stitch side and rear images together to form a seamless panorama, the images are transformed into the same visualization coordinate frame. That is, the images are transformed independently based on system calibration parameters such that each image appears as if captured with the same virtual camera located above and in front of the vehicle facing to the rear.

After the images are transformed, the transformed images are stitched together at boundaries selected to minimize visual distortion effects and discontinuities in object representation. Optimal boundaries or seams for fusing the images are determined using depth information from the stereo camera pair. Further, temporal smoothing may be applied to the seam selection to smooth the transitions between seam changes over time. In some embodiments, a single blending look-up table (LUT) specifying weights for stitching the images together to form a panorama is generated using the computed optimal seam lines.

The camera configuration on the vehicle may create blind zones at either corner of the rear bumper of the vehicle. If an object is immediately next to the bumper, the object may be in the FOV of only one camera. In this instance, the stitching of the images could remove the object from the resulting panorama entirely or the object could appear ghosted, i.e., replicated with small offset. In some embodiments, another sensor modality is used to detect the presence of objects in the blind zones. If an object is detected, the seam selection is biased to include more of the image where the object is present such that at least some of the object will be visible in the panorama.

FIG. 1 is a top-down view of an example vehicle 100 that includes an embodiment of a rear-stitched view panorama (RSVP) system. The RSVP system (not specifically shown) is coupled to four cameras 102, 104, 106, 108 mounted at different positions on the vehicle 100. The RSVP system includes hardware and software to receive video streams captured by the cameras and to process the video streams to generate rear-view panoramas that are displayed to a driver of the vehicle 100.

The cameras 102 and 108 are mounted on opposite sides of the vehicle 100 to replace the side-view mirrors, and the camera 104 and 106 are a stereo pair mounted on the rear of the vehicle 100 to capture the view typically seen through the center interior rear-view mirror. That is, the camera 102 captures the right mirror image, which may be referred to as $R_{mirror}$ herein, the camera 108 captures the left mirror image, which may be referred to as $L_{mirror}$ herein, the camera 104 captures the right stereo image, which may be referred to as $R_{stereo}$ herein, and the camera 106 captures the left stereo image, which may be referred to as $L_{stereo}$ herein. The cameras 102, 104, 106, 108 are positioned such that each has a respective rear field of view (FOV) angle. Any suitable FOV angle may be used. In some embodiments, the FOV angle is in the range of 50 to 60 degrees.

As is explained in more detail herein, the output panoramas are a combination of the images from cameras 102, 108, and a reference camera from the stereo camera 104, 106. Embodiments are explained herein assuming the reference camera is the left stereo camera 106. One of ordinary skill in the art will understand embodiments in which the reference camera is the right stereo camera 104. Further, the depth information from cameras 104, 106 is used to determine seam lines for stitching the images from cameras 102, 106, 108 to form the panoramas.

Figure 2:
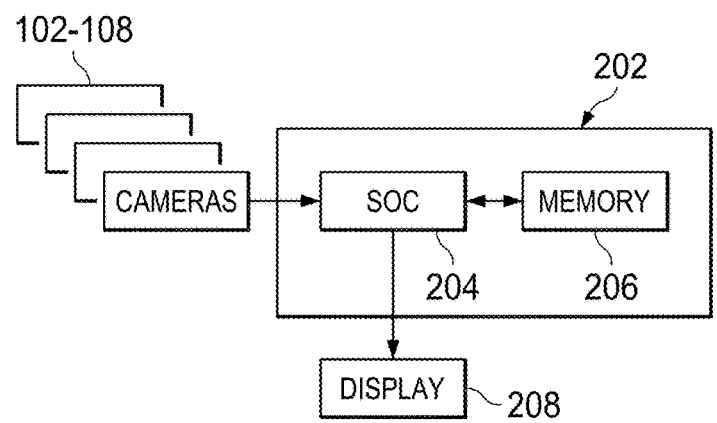
FIG. 2 is a simplified block diagram of the RSVP system of FIG. 1.

FIG. 2 is a simplified block diagram of an example RSVP system 202 included in the vehicle 100 of FIG. 1. The RSVP system 202 includes a system-on-a-chip (SOC) 204 coupled to the cameras 102-108 and the display device 208 and to a memory 206. The SOC 204 may be any SOC suitable for real-time image generation. Some examples of suitable SOCs are the family of TDA2x and TDA3x SOCs available from Texas Instruments Incorporated. The memory 206 may be any suitable combination of memory technologies such as, for example, random access memory, read-only memory, and/or flash memory.

The memory 206 stores executable software instructions of the RSVP system 202 that may be executed on one or more processors of the SOC 204. The executable software instructions include instructions of an embodiment of rear-view panorama image generation as described herein. The display device 208 is configured to display the rear-view panoramas to the driver. The display device 208 may be installed, for example, in the location of the typical interior center rear-view mirror.

To generate a panorama from three images, the extrinsic parameters, i.e., camera location and orientation, of each camera 102, 106, 108 providing an image are needed. As is explained in more detail herein, each image is transformed using the extrinsic parameters to appear as if the image was captured by a virtual camera with arbitrary location and orientation. This virtual camera is considered to be the capture device for the generated panoramas. A chart-based calibration process may be performed offline, e.g., in the factory, to determine the extrinsic parameters for each of the three cameras 102, 106, 108.

Figure 3:
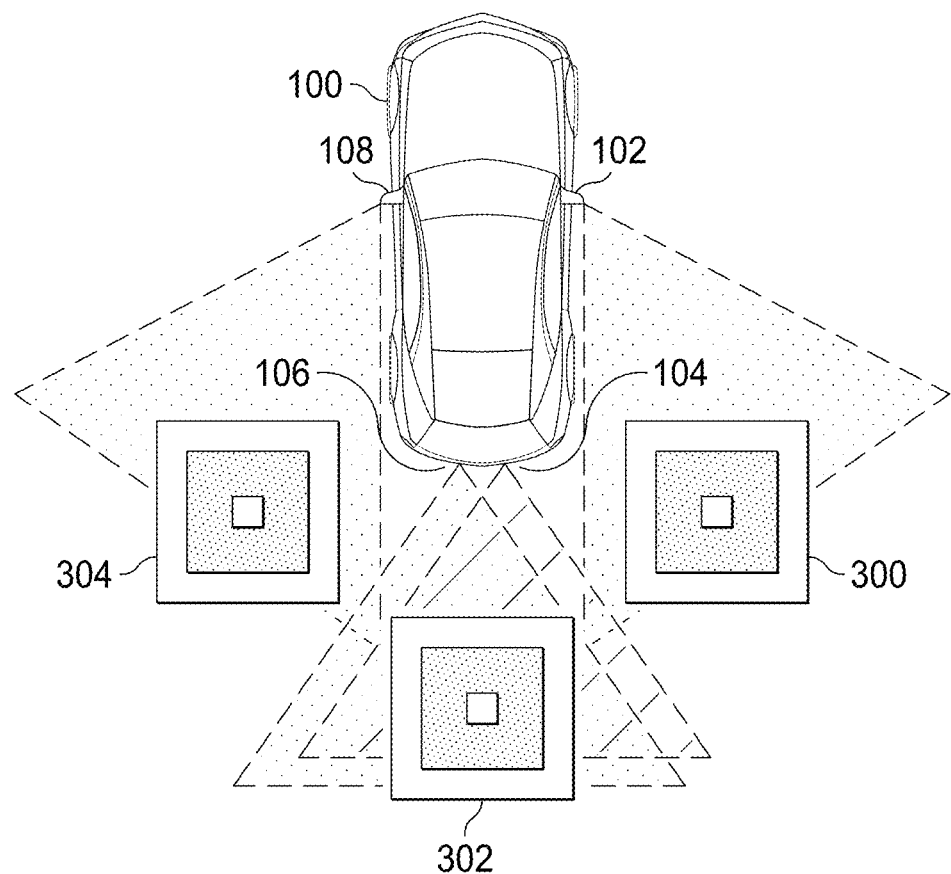
FIG. 3 depicts an example arrangement of three calibration charts around the vehicle of FIG. 1.

Referring now to FIG. 3, in some embodiments, to perform the calibration, a set of three calibration charts 300, 302, 204 with known dimensions and relative locations are placed coplanar with the ground plane around the vehicle 100. The vehicle 100 is aligned with the calibration charts 300-304 such that one full square pattern is visible to each camera 102-108. Determining the locations of the eight corner pixels, i.e., feature pixels, of each chart in the respective camera images provides sufficient correspondences to known world coordinates to calibrate the cameras as each corner in each captured image has an associated two-dimensional (2D) coordinate in the image plane and a real world three-dimensional (3D) coordinate. Techniques for finding the corner pixels in the images are described, for example, in United States Patent Publication 2017/0124710, filed Oct. 14, 2016, which is incorporated by reference herein.

In some embodiments, calibration is performed for all four cameras as the distance or baseline between the left and right stereo cameras is needed. In some embodiments, the stereo camera pair may be pre-calibrated in a fixed assembly and the baseline is known. In such embodiments, calibration is not performed for the right stereo camera.

Using these correspondences, the homography from the camera image plane to world coordinates may be estimated using a direct linear transformation. Furthermore, projecting the homography matrix on an orthogonal sub-space provides the extrinsic pose of the camera in the world coordinate system. Since the pixels on a chart are measured with physical dimensions, the same physical interpretation is transitioned in the pose estimate of the cameras. In some embodiments, an additional non-linear optimization is applied to improve the estimation. For example, an embodiment of the well-known Levenberg-Marquardt approach may be used.

Figure 4:
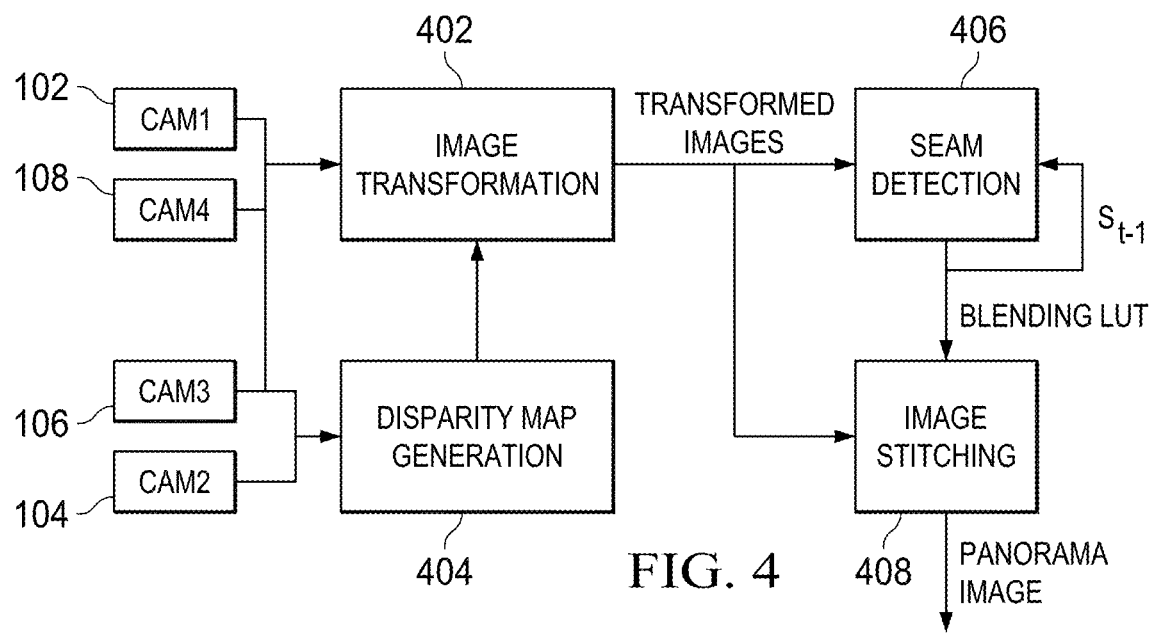
FIG. 4 is a flow diagram of a method for generation of rear-stitched view panoramas that may be implemented by the RSVP system of FIG. 2.

FIG. 4 is a flow diagram of a method for generation of rear-stitched view panoramas that may be implemented, for example, on the SOC 204 of FIG. 2. A disparity map is generated 404 based on the left and right stereo images from the stereo cameras 104, 106. Any suitable technique may be used for generating the disparity map.

The images of the rear scene of the vehicle 100 from the rear perspective of each camera 102, 106, 108 are transformed 402 to a virtual world view using the intrinsic and extrinsic parameters of respective cameras. The transformation assumes a virtual world around the vehicle 100 represented by a flat surface located some distance behind the vehicle and projects the appropriate FOV from each camera onto the flat surface. More specifically, the transformation includes projecting each image pixel onto a flat surface behind the vehicle 100 using the virtual camera parameters to project the image into the virtual camera image. In addition, the same transformation that is applied to the image from the left stereo camera 106 is applied to the disparity map to obtain a virtual camera "view" of the disparity. Image transformation is explained in more detail below in reference to FIGS. 5-9.

In general, virtual camera parameters may be determined based on the vehicle. The location and viewing angle in the same coordinate frame as the physical cameras is needed. For example, the virtual camera position may be fixed at the middle pixel of the left and right cameras raised above by 0.5 meters and moved forward by 0.5 meters such that the virtual camera position has the perspective of looking in from the front of the vehicle. The angle of the virtual camera from the horizontal ground plane may also be fixed at −30 degrees. The virtual camera angle and position may be user parameters that allow the driver of the vehicle to change the virtual camera parameters to match viewing needs, much akin to adjusting a physical rear view mirror.

Seam detection 406 is then performed to determine optimal boundaries along which adjacent images are to be combined. The seam detection is performed using the transformed images and the transformed disparity map. The result of the seam detection is a blending look-up table (LUT) the same size as the output panorama with weights specifying the alpha blending coefficients for combining the images at the seams to generate the panorama. Seam detection and LUT generation is explained in more detail below in reference to FIGS. 10-14.

The images are then stitched 408 together to form the output panorama by applying the weights in the LUT to the images. Stitching of images is explained in more detail below.

Figure 5:
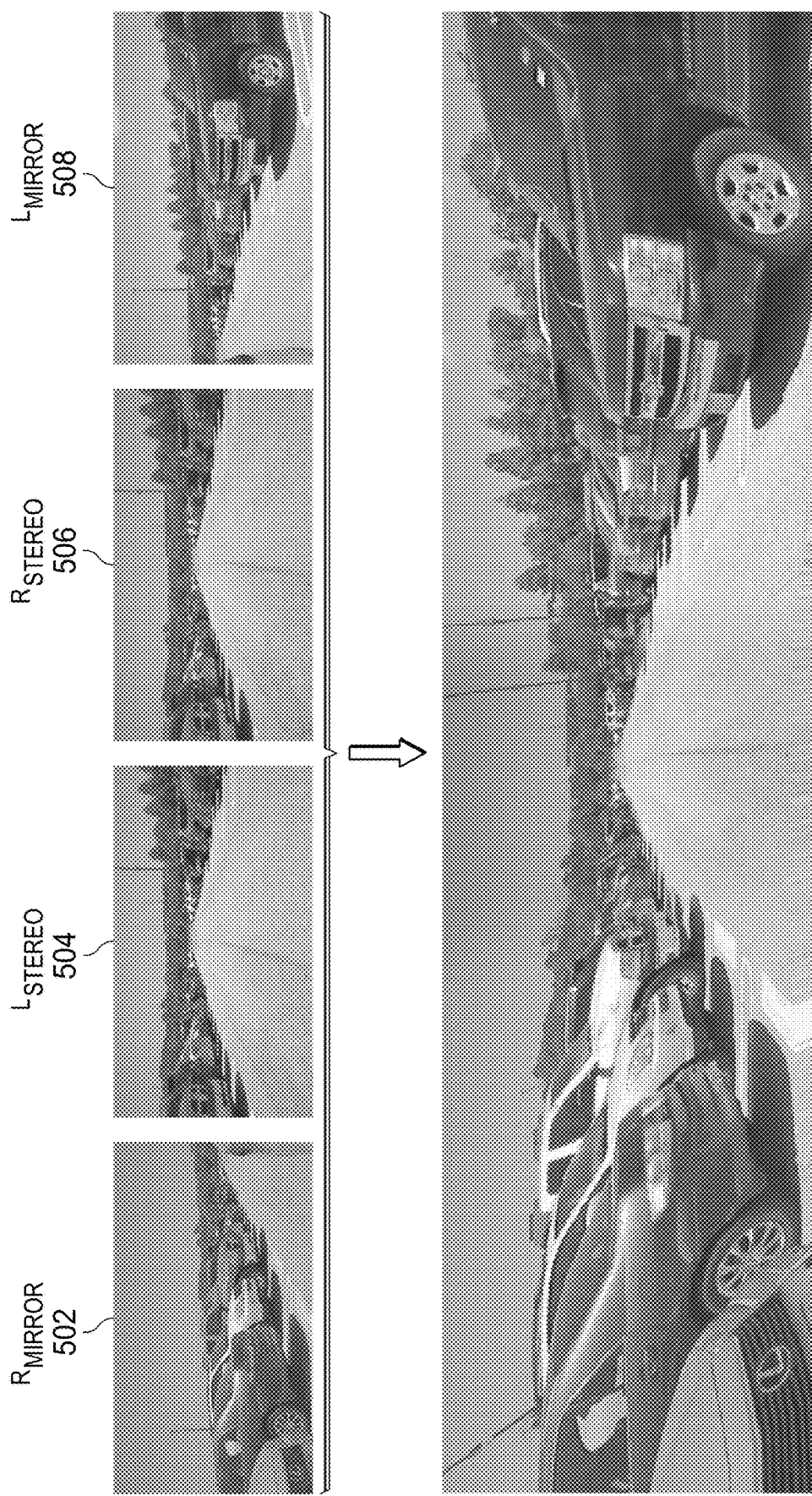
FIG. 5 is an example set of captured images.

Transformation, seam detection, and stitching are now explained in more detail. FIG. 5 shows an example set of captured images 502-508 from a right camera, a stereo camera pair, and a left camera such as cameras 102-108, and the panorama 510 generated from the images of the right camera, the left stereo camera, and the left camera. Transformation, seam detection, and stitching are illustrated below based on this example set of images. Images from the left camera and the right camera may be referred to respectively as $L_{mirror}$ and $R_{mirror}$ herein, and images from the stereo camera pair may be referred to as $L_{stereo}$ and $R_{stereo}$ herein.

Figure 6:
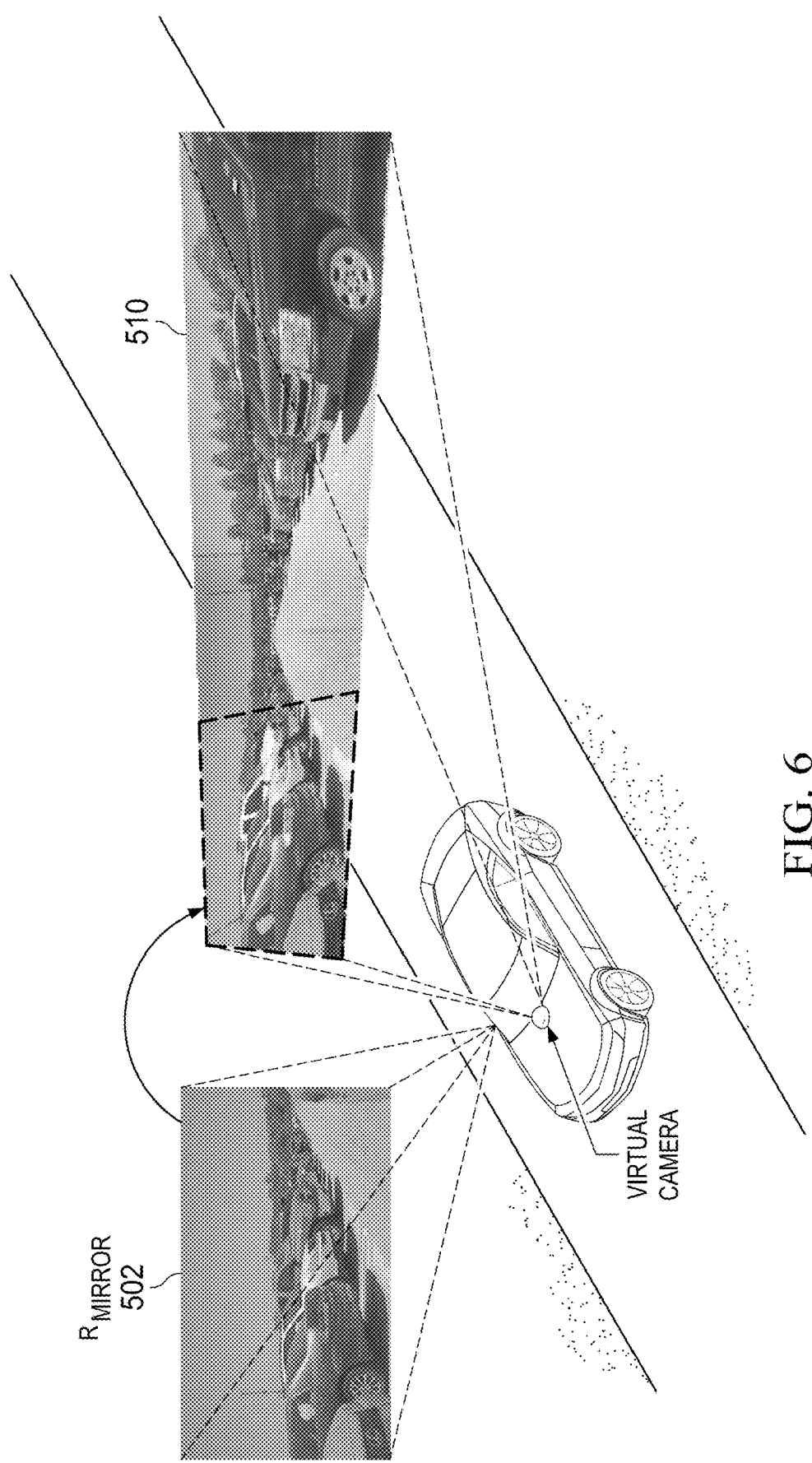
FIG. 6 is an example visualization of projected the right mirror image onto the virtual display surface.

As previously mentioned, the panorama is projected on a virtual flat surface behind the vehicle. Thus, a single projective transform can be computed for each of the images $L_{mirror}$, $L_{stereo}$, and $R_{mirror}$. Each projective transform is computed from the intrinsic and extrinsic parameters estimated for the corresponding camera during calibration. Each projective transform is applied to the respective image to obtain transformed images $L'_{mirror}$, $L'_{stereo}$, and $R'_{mirror}$. The projective transform computed for $L_{stereo}$ is also used to transform the disparity map D to generate the transformed disparity map D'. FIG. 6 is an example visualization of projecting the right mirror image 502 onto the virtual display surface 510.

Figure 7:
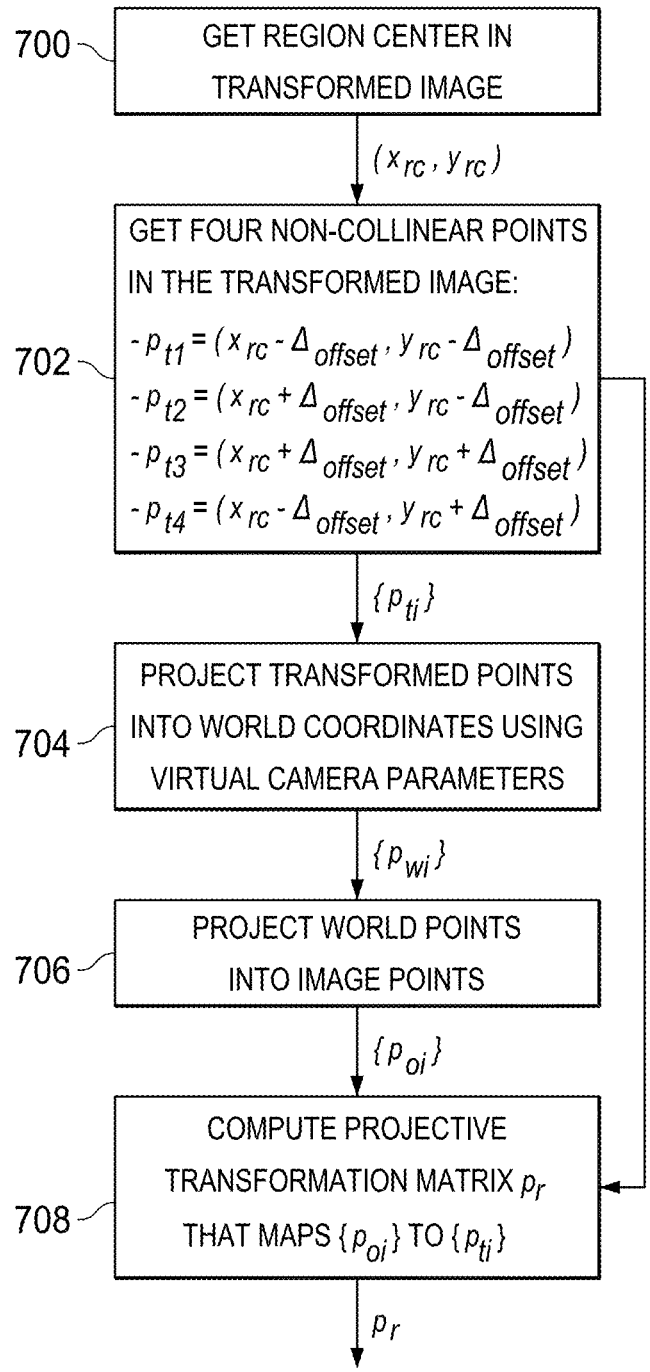
FIG. 7 is a flow diagram of a method for computing a projective transform.

FIG. 7 is a flow diagram of a method for computing a projective transform for an image. This method may be performed as part of factory calibration as the projective transform for an image is based on the physical camera extrinsic parameters, the distance of the flat surface from the camera, and the position of the virtual camera, all of which are known after the physical cameras are calibrated. Initially, the region center of the transformed image is determined 700. Based on the known dimensions w×h of the panorama and approximate constraints that the left camera projects to the left third of the panorama, the left stereo camera projects to the center of the panorama, and the right camera projects to the right third of the panorama, the center pixel ($x_{rc}$, $y_{rc}$) of the region corresponding to the image can determined.

Figure 8:
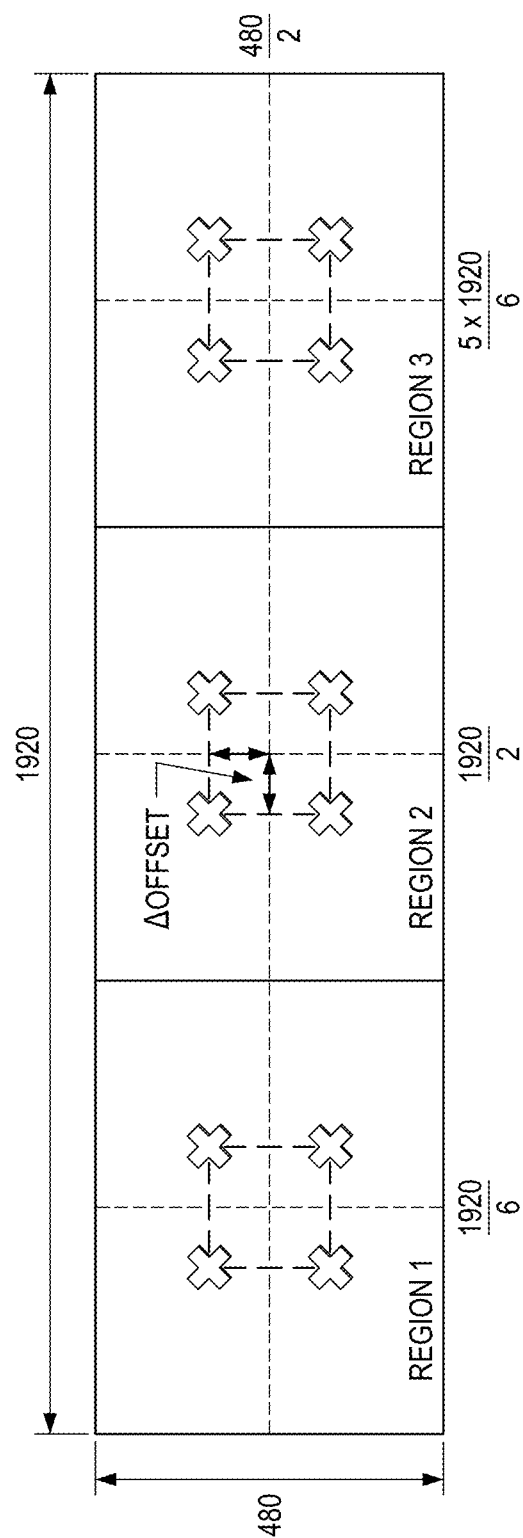
FIG. 8 is an example illustrating regions corresponding to the left, center, and right images in a panorama.

Next, four non-collinear pixels at a small offset $\Delta_{offset}$ from the center pixel ($x_{rc}$, $y_{rc}$) are selected 702 in the transformed image. The pixels are selected so that no three pixels are collinear. Any suitable value for $\Delta_{offset}$ may be used. In general, the final projective transform improves with an increase in distance from the center pixel. Thus, the largest possible value of $\Delta_{offset}$ is desirable. For example, the value of $\Delta_{offset}$ may be 240 for a 1920×480 panorama. FIG. 8 is a simple example illustrating the regions corresponding to the left, center, and right images in a panorama that is 1920×480. The center pixels of each region and the four non-collinear pixels are shown.

Referring again to FIG. 7, the four pixels are projected 704 into world coordinates using the virtual camera parameters. The world pixels are then projected 706 into image pixels. The virtual camera position and orientation is known and well as the location of the flat surface. This information is used to project the four pixels in the virtual camera image to the flat surface or world. Further, how the pixels on the flat surface map to the input camera images is also known based on the camera calibration. Thus, there is a relationship between four pixels on the final output of the virtual camera image to four pixels in the input image. The projective transform matrix that maps the image pixels to the transformed pixels is then computed 708. Given correspondences for four pixels from the output image to the input image, the projective transform matrix can be generated with four sets of pixel correspondences.

Figure 9:
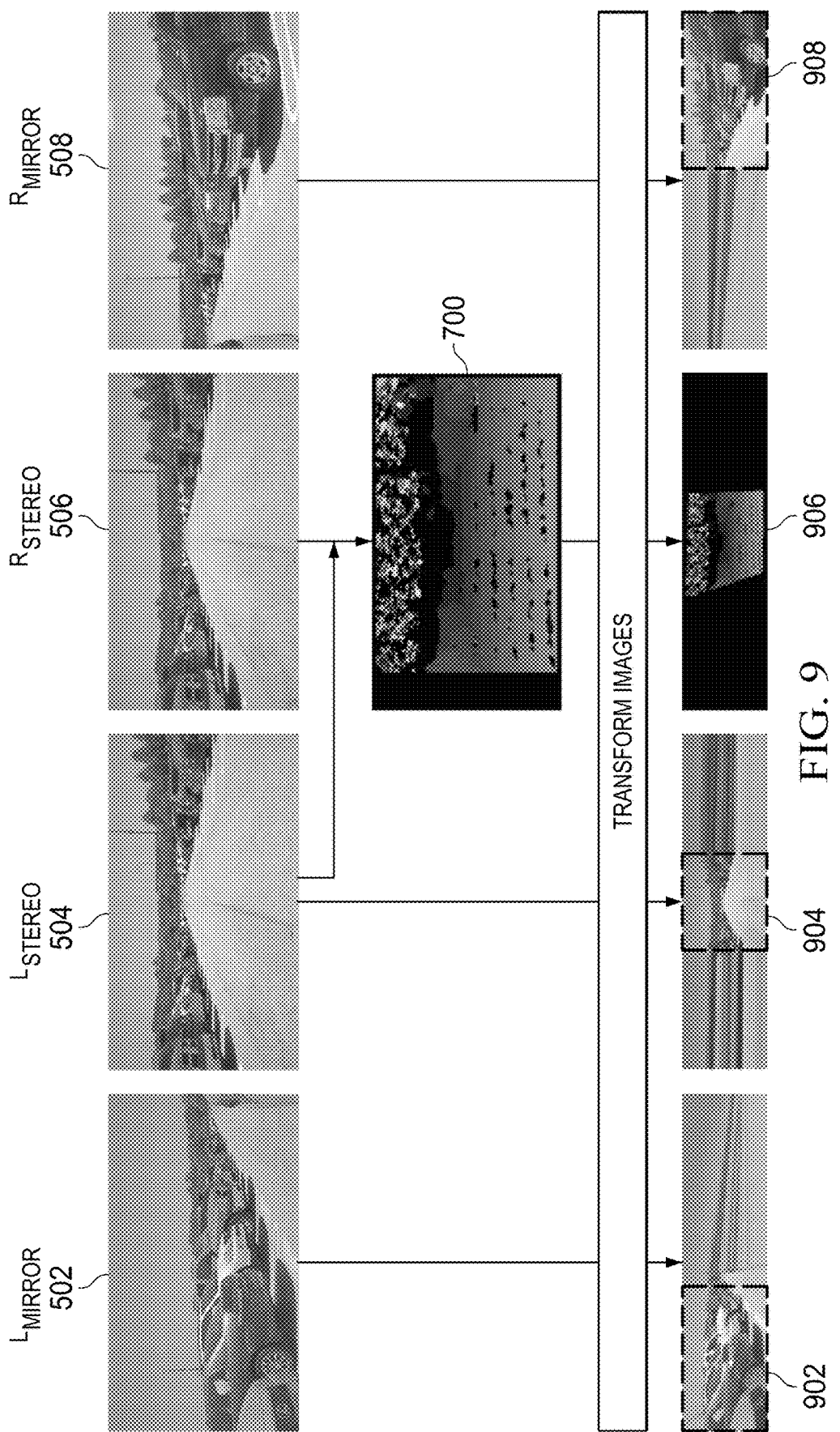
FIG. 9 shows the transformed images of FIG. 5.

FIG. 9 shows the transformed images corresponding to respective images 502, 504, 508 of FIG. 5 and the FOV of interest 902, 904, 908 in each transformed image. The FOVs 902, 904, 908 are combined to form the panorama by stitching along seams determined by the scene detection.

FIG. 9 also shows the disparity map 700 generated for the stereo images 504, 506 and the transformed disparity map 906.

Because the panorama is essentially a projection onto a flat surface with a predetermined depth, if seams are selected such that the seams pass through objects at the surface distance, those objects appear seamlessly stitching in the output panorama. In other words, in the process of projecting from each captured image to the virtual surface, a world location that lies on the virtual surface and is captured by adjacent cameras will project back to the same world location in the virtual view and thus look aligned. Stereo information can be used to locate pixels in world space that are close to the projection surface, so that a seam running through their corresponding image pixels can be computed.

Figure 10:
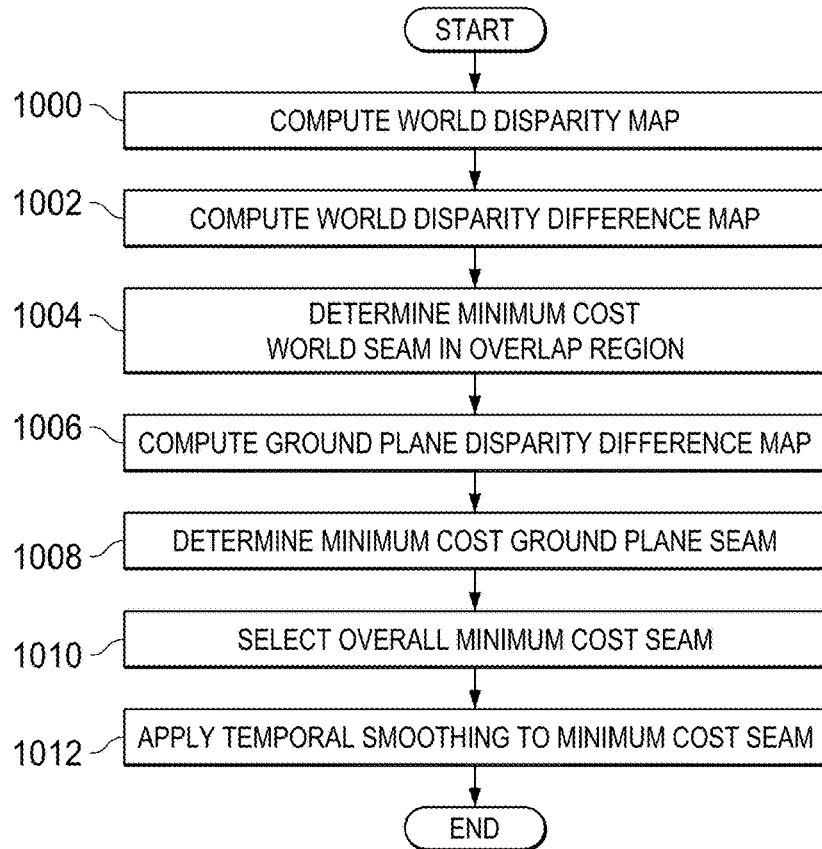
FIG. 10 is a flow diagram of a method for finding the minimum cost seam for stitching two images together.

FIG. 10 is a flow diagram of a method for finding the minimum cost seam for stitching two images together. The method may be used to find the minimum cost seam for stitching the left camera image and the left stereo image and the minimum cost seam for stitching the left stereo image and the right camera image. The search for the minimum cost seam is performed in an overlap region. The overlap region between the left camera image and the left stereo image and between the left stereo image and the right camera image may be determined as part of calibration of the RSVP system.

In this method, two candidate seams are determined, the minimum cost seam found by matching flat surface disparities to the transformed disparity map and the minimum cost seam found by matching ground plane disparities to the transformed disparity map. The seam with the minimum cost of the two is selected as final seam for stitching. Seams along the ground plane are considered to allow for cases where there are no significant objects at the depth of the flat surface, i.e., for cases where there are insufficient matches between the projection surface disparities and the transformed disparity map.

Initially, a world disparity map $D_W$ is computed 1000. That is, a disparity is computed for each pixel on the virtual flat surface using the known location of the pixel relative to the stereo cameras. A disparity value may be computed as follows. As is well known, the equation $$Z = B * f / d$$

can be used to calculate depth given a stereo image, where B is the distance between the two cameras, f is the camera focal length, d is the disparity, and Z is the depth at a given location. This equation is used to estimate depth of locations in the stereo camera image. To calculate a disparity on the flat surface, the flat surface is defined at a specific, known depth from the stereo camera, i.e., the distance at which the images are to be stitched is predetermined. Thus, a disparity value can be calculated as per $$d = B * f / Z$$

where Z is known and d is unknown.

A world disparity difference map $D_\Delta$ is then computed 1002 by comparing corresponding disparity values in $D_W$ and the transformed disparity map D'. Specifically, $D_\Delta$ may be computed by taking the magnitude of the difference between corresponding disparity values in $D_W$ and D' as per $$D_\Delta = |D' - D_W|.$$

Figure 13:
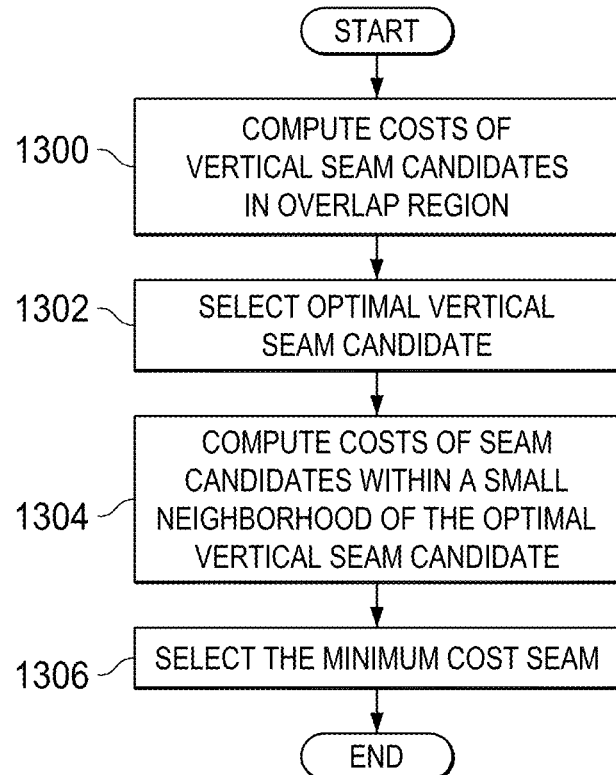
FIG. 13 is a flow diagram of a method for determining a minimum cost seam in an overlap region.

As is explained in more detail in reference to FIG. 13, the cost of a seam candidate is defined by a set of pixel disparities in $D_\Delta$.

The minimum cost world seam $s_{min,W}$ in the overlap region is then determined 1004. That is, candidate seams in the overlap region are searched to find the seam with the minimum cost as determined by a corresponding set of pixel disparities in the world disparity difference map $D_\Delta$. A seam s is specified by a set of pixels in a linear path from the top to the bottom of the panorama in the overlap region. Thus, a seam includes one pixel per row in the panorama. A method for finding the minimum cost seam is described in reference to FIG. 13.

A ground plane disparity difference map $D_\Delta$ is then computed 1006 by comparing corresponding disparity values in a predetermined ground plane disparity map $D_G$ and the transformed disparity map D'. Specifically, $D_\Delta$ may be computed by taking the magnitude of the difference between corresponding disparity values in $D_G$ and D' as per $$D_\Delta = |D' - D_G|.$$

As is explained in more detail in reference to FIG. 13, the cost of a seam candidate is defined by a set of pixel disparities in $D_\Delta$.

The minimum cost ground plane seam $s_{min,G}$ in the overlap region is then determined 1008. That is, candidate seams in the overlap region are searched to find the seam with the minimum cost as determined by a corresponding set of pixel disparities in the world disparity difference map $D_\Delta$. A method for finding the minimum cost seam is described in reference to FIG. 13.

The overall minimum cost seam $s_{min}$ is selected 1010 from the ground plane seam $s_{min,G}$ and world seam $s_{min,W}$, i.e., the seam with the lowest cost is selected as the overall minimum cost seam as per $$s_{min} = \min(s_{min,W}, s_{min,G}).$$

Temporal smoothing is then applied 1012 to the minimum cost seam $s_{min}$ to determine the final seam $s_t$. A method for temporal smoothing is described in reference to FIG. 11. Temporal smoothing is applied because there may be large jumps and jitter in the stitching boundary between consecutive panoramas that could be distracting and disorienting to the operator of the vehicle if new seams are computed independently for each panorama. To maintain temporal consistency, the seam location in the previous panorama is considered along with minimum and maximum distance thresholds for seam movement $p_{min}$ and $p_{max}$. The minimum distance threshold $p_{min}$ is used to avoid jitter and the maximum distant threshold $p_{max}$ is used to avoid a large jump from the seam in the previous panorama to the seam for the current panorama. Any suitable values of $p_{min}$ and $p_{max}$ may be used. In some embodiments, the values are chosen empirically.

Figure 11:
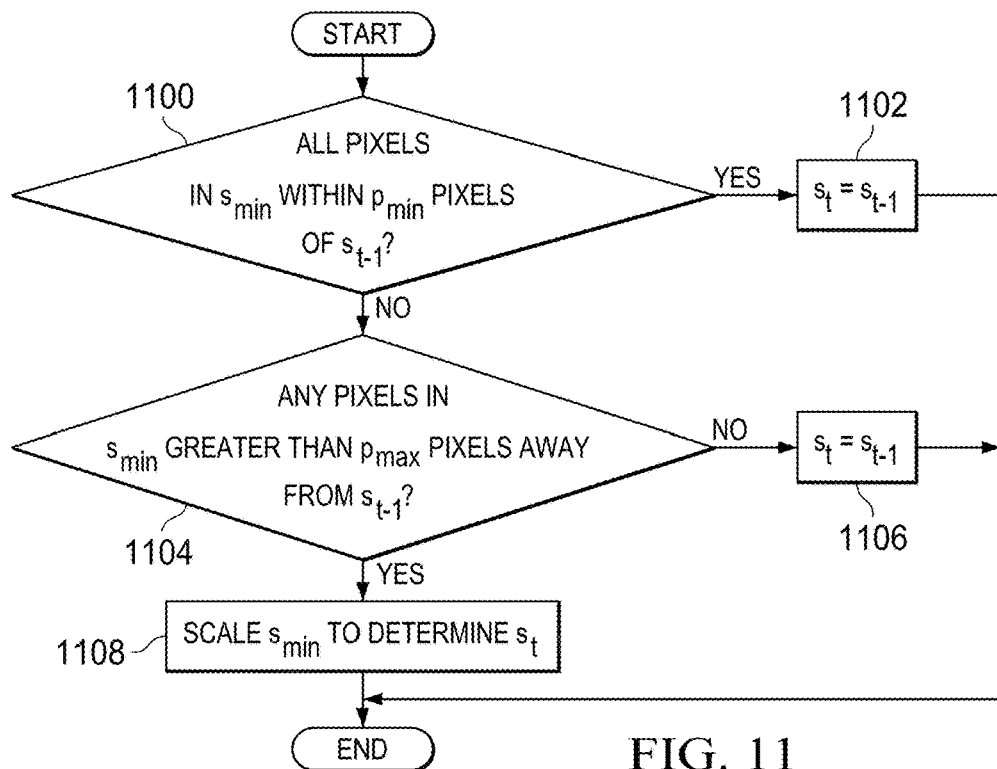
FIG. 11 is a flow diagram of a method for temporal smoothing to determine the final seam.

FIG. 11 is a flow diagram of a method for temporal smoothing to determine the final seam $s_t$. Initially, a determination is made 1100 as to whether or not all pixels in the minimum cost seam $s_{min}$ are within $p_{min}$ pixels of the previous seam $s_{t-1}$. If all pixels are within $p_{min}$ pixels, then the final seam $s_t$ is set 1102 to the previous seam $s_{t-1}$. Otherwise, a determination is made 1104 as to whether or not any pixel in the minimum cost seam $s_{min}$ is greater than $p_{max}$ pixels away from the previous seam $s_{t-1}$. If no pixel is greater than $p_{max}$ pixels away from the previous seam $s_{t-1}$, then the final seam $s_t$ is set 1106 to the minimum cost seam $s_{min}$.

Otherwise, the minimum cost seam $s_{min}$ is scaled 1108 such that the largest pixel displacement between the minimum cost seam $s_{min}$ and the previous seam $s_{t-1}$ is $p_{max}$ to determine the final seam $s_t$. More specifically, considering the pixels comprising each seam:

$$s_{min} = \{(x_{1,min}, y_{1,min}), \ldots, (x_{h_{RSVP},min}, y_{h_{RSVP},min})\}$$

$$s_{t-1} = \{(x_{1,t-1}, y_{1,t-1}), \ldots, (x_{h_{RSVP},t-1}, y_{h_{RSVP},t-1})\}$$

$$s_t = \{(x_{1,t}, y_{1,t}), \ldots, (x_{h_{RSVP},t}, y_{h_{RSVP},t})\}$$

where $h_{RSVP}$ is the height of the panorama, then the x coordinates of the final seam $s_t$ may be computed by scaling the minimum cost seam $s_{min}$ as per $$\Delta_{x1} = |x_{1,min} - x_{1,t-1}|$$

$$\Delta_{xh_{RSVP}} = |x_{h_{RSVP},min} - x_{h_{RSVP},t-1}|$$

$$r = \frac{\max(\Delta_{x1}, \Delta_{x_{h_{RSVP}}})}{p_{max}}$$

$$x_{i,t} = x_{i,t-1} + \frac{x_{i,min} - x_{i,t-1}}{r} \forall i = [1, h_{RSVP}].$$

Figure 12:
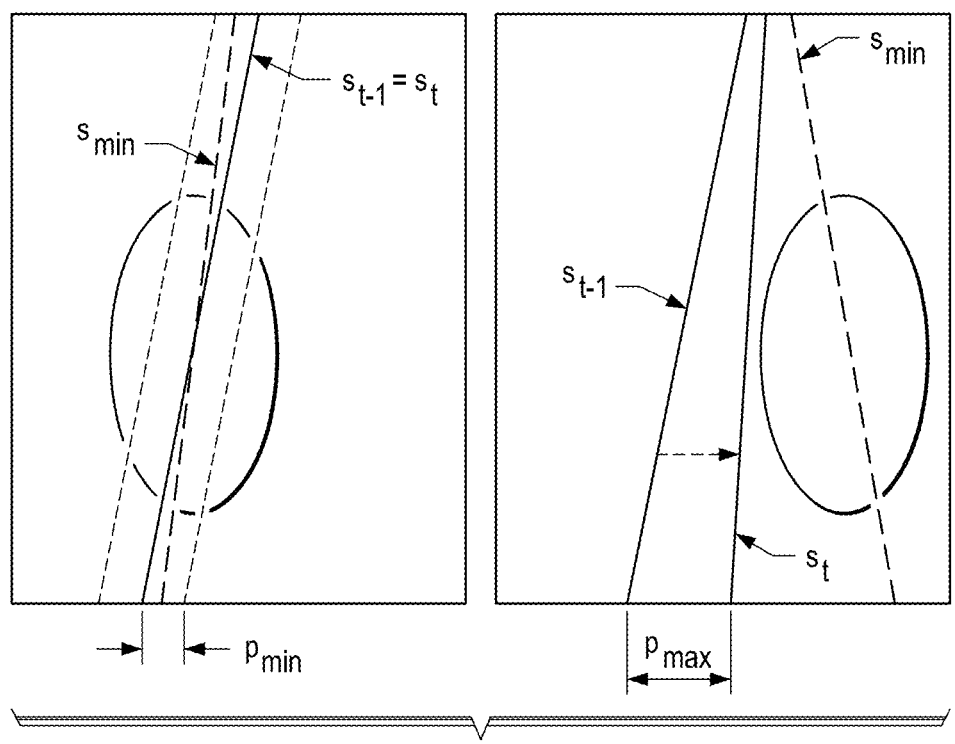
FIG. 12 shows examples of how displacement thresholds can affect the manner in which the final seam is chosen.

FIG. 12 shows examples of how the displacement thresholds can affect the manner in which the final seam $s_t$ is chosen. As the example on the left shows, when all the pixels of the minimum cost seam $s_{min}$ are within $p_{min}$ pixels of the previous seam $s_{t-1}$, then the previous seam is used for stitching to minimize jitter, i.e., $s_t = s_{t-1}$. As the example on the right shows, when pixels in the minimum cost seam $s_{min}$ are more than $p_{max}$ pixels away from the previous seam $s_{t-1}$, the minimum cost seam $s_{min}$ is scaled to avoid a large jump from the precious seam $s_{t-1}$ to the minimum cost seam $s_{min}$.

FIG. 13 is a flow diagram of a method for determining a minimum cost seam in an overlap region. This method may be used to find the minimum cost seam in the world, i.e., on the flat surface, and the minimum cost seam on the ground plane. An input to this method is a disparity difference map $D_\Delta$, which may be the disparity difference map between the ground plane disparity map $D_G$ and the transformed disparity map D' or the disparity difference map between the world disparity difference map $D_\Delta$ and the transformed disparity map D'.

Initially, the costs of vertical seam candidates in the overlap region are computed 1300. That is, beginning with a predetermined vertical seam in the overlap region, the costs for vertical seams within the overlap region at a predetermined step size from the previous vertical seam, e.g., 16 pixels, are computed. Any suitable step size may be used and may be selected for optimal computational performance. For example, the predetermined vertical seam may be at the left side of the overlap region. A cost is determined for the predetermined vertical seam, then for the vertical seam that is 16 pixels to the right of the predetermined vertical seam, then for the vertical seams that is 32 pixels to the right of the predetermined vertical seam, etc. The optimal vertical seam candidate, i.e., the vertical seam with the minimum cost, is selected 1302 from the candidate vertical seams.

The costs of seam candidates within a small neighborhood, e.g., ±16 pixels, of the selected optimal vertical seam candidate within the overlap region are then computed 1304. Any suitable neighborhood size may be used. In some embodiments, the neighborhood is between the vertical seams on either side of the selected vertical seam candidate. For each pixel at the top of the small neighborhood, the cost of a seam from that pixel to each of the bottom pixels in the neighborhood is computed. The seam in the small neighborhood with the minimum cost is selected 1306 as the minimum cost seam.

The cost of a seam candidate $s = \{(x_i, y_i)\}$ may be computed as the sum of the disparity values in the disparity difference map $D_\Delta$ corresponding to the pixels in the seam candidate s, normalized by the number of valid corresponding disparity values in the transformed disparity map D'. That is, the cost $c_s$ of a candidate seam s with discretized pixels $\{(x_1, y_1), \ldots, (x_{h_{RSVP}}, y_{h_{RSVP}})\}$ may be computed as per $$c_s = \frac{\sum_{i=1: h_{RSVP}, D'(x_i, y_i) > 0} D_\Delta(x_i, y_i)}{|D'(s) > 0|}$$

where $|D'(s) > 0|$ is the number of pixels in the seam candidate s with valid disparity values in D' and $h_{RSVP}$ is the height of the panorama in pixels.

In some embodiments, a constraint is imposed in the cost computation to only allow surface pixels with disparity estimates less than a threshold disparity value $\Delta_w$ to contribute the cost. Any suitable value of $\Delta_w$ may be used. In some embodiments, the value is determined empirically and may depend on stitching accuracy requirements. Without this constraint, the seam selection will be biased towards selecting a seam along the ground plane because the ground is a dominate feature in the majority of vehicle operation scenarios. Using the threshold disparity value $\Delta_w$, the cost $c_s$ of a candidate seam s may be computed as per $$c_s = \frac{\sum_{i=1: h_{RSVP}, D'(x_i, y_i) < \Delta_w} D_\Delta(x_i, y_i)}{|0 < D'(s) < \Delta_w|}.$$

Once the final seam $s_t$ is chosen for each of the two overlapping regions, a single blending LUT of the same size as the panorama is computed with weights specifying alpha-blending coefficients for combining the pairs of images. In some embodiments, the alpha values are computed such that each alpha value is 0.5 for each pixel in the final seam $s_t$ and linearly decreases from 1 to 0 over a predetermined blending width around the seam $s_t$. A suitable blending width may be determined empirically. Other suitable alpha values may also be used.

Figure 14:
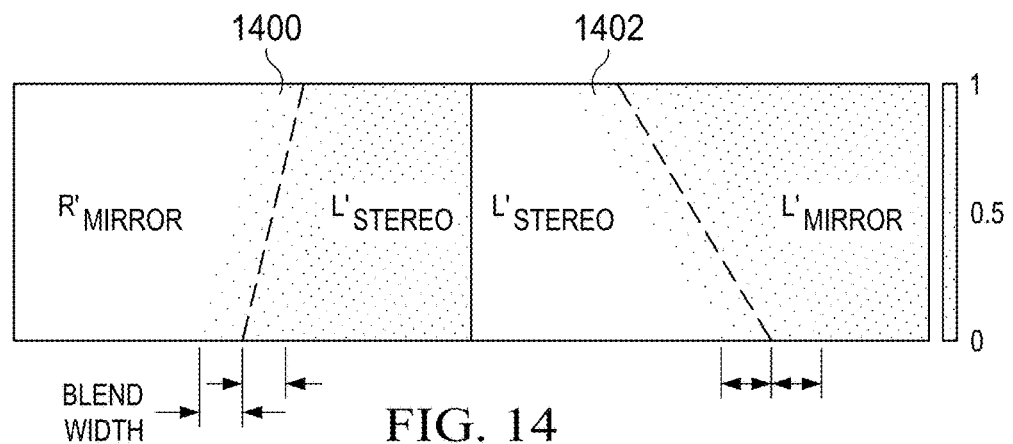
FIG. 14 is an example of a blending look-up table (LUT)

A single blending LUT may be used because the left seam always falls in the left half of the panorama and the right seam always falls in the right half of the panorama. Thus, the blending LUT can be generated under these assumptions and the weights may be defined with respect to the left image of each pair of images to be combined. FIG. 14 is an example of a blending LUT in which the weight at each pixel on both seam lines is 0.5. The lines 1400, 1402 indicate the seam locations.

Given the blending LUT represented by $$\{W_{i,j}, i \in \{1, \ldots, h_{RSVP}\}, j \in \{1, \ldots, w_{RSVP}\}\},$$

where $w_{RSVP}$ is the width of the panorama in pixels, stitching of the images to form the panorama may be performed as per the following for the left and right halves of the panorama RSVP, respectively:

$$\text{For } j = \left\{1, \ldots, \frac{w_{RSVP}}{2}\right\} \text{ and } \forall i,$$

-continued $$RSVP(i, j) = W_{ij}R'_{mirror}(i, j) + (1 - W_{ij})L'_{stereo}(i, j)$$

$$\text{For } j = \left\{\frac{w_{RSVP}}{2} + 1, \ldots, w_{RSVP}\right\} \text{ and } \forall i,$$

$$RSVP(i, j) = W_{ij}L'_{stereo}(i, j) + (1 - W_{ij})L'_{mirro}(i, j).$$

Figure 15:
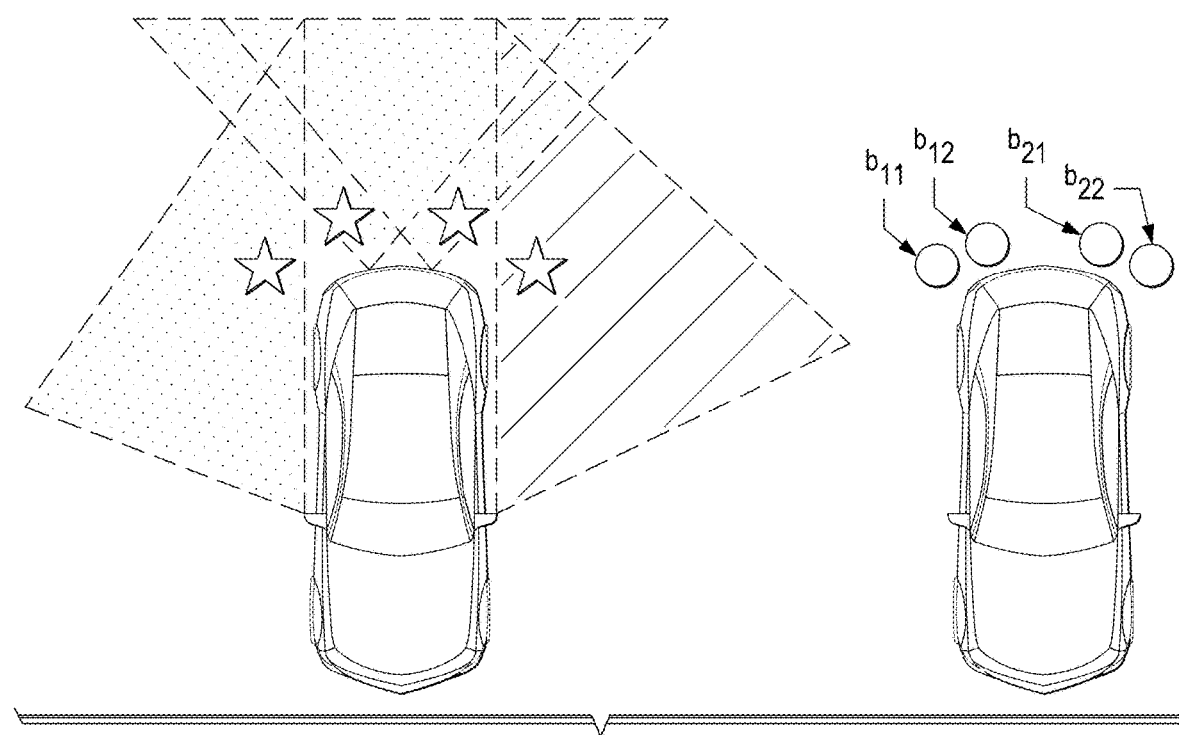
FIG. 15 shows examples of blind zones.

The camera configuration eliminates the traditional blind spots that result from traditional rear view mirror configurations but, as previously mentioned herein, may create blind zones at either corner of the rear bumper of the vehicle. The method above may select seams that eliminate an object completely in the displayed panorama if the object is in one of the blind zones as objects in these areas may appear in only one image. The locations of the blind zones are generally depicted by the stars in the left example of FIG. 16. The blind zones may be referred to as $b_{11}$, $b_{12}$, $b_{21}$, and $b_{22}$ herein as illustrated in the right example of FIG. 15.

In some embodiments, a modality for object detection, e.g., radar, lidar, ultrasound, computer vision, etc., provides information regarding the presence of objects in these blind zones to the seam finding of the method of FIG. 10. More specifically, if an object is detected in a blind zone, the final seam corresponding to the image containing the detected object is biased to ensure that at least some of the object will be visible in the panorama. The biasing may be performed as follows. If an object is detected in $b_{11}$ or $b_{22}$, bias the final seam toward the center of the panorama. If an object is detected in $b_{12}$, bias the final seam toward the left of the panorama. If an object is detected in $b_{21}$, bias the final seam toward the right of the panorama. Any suitable bias may be used. In some embodiments, the bias is set such that the previous seam location is moved to the respective edge of the overlap region so that the new seam will not move significantly from the edge if any object is detected.

Figure 16:
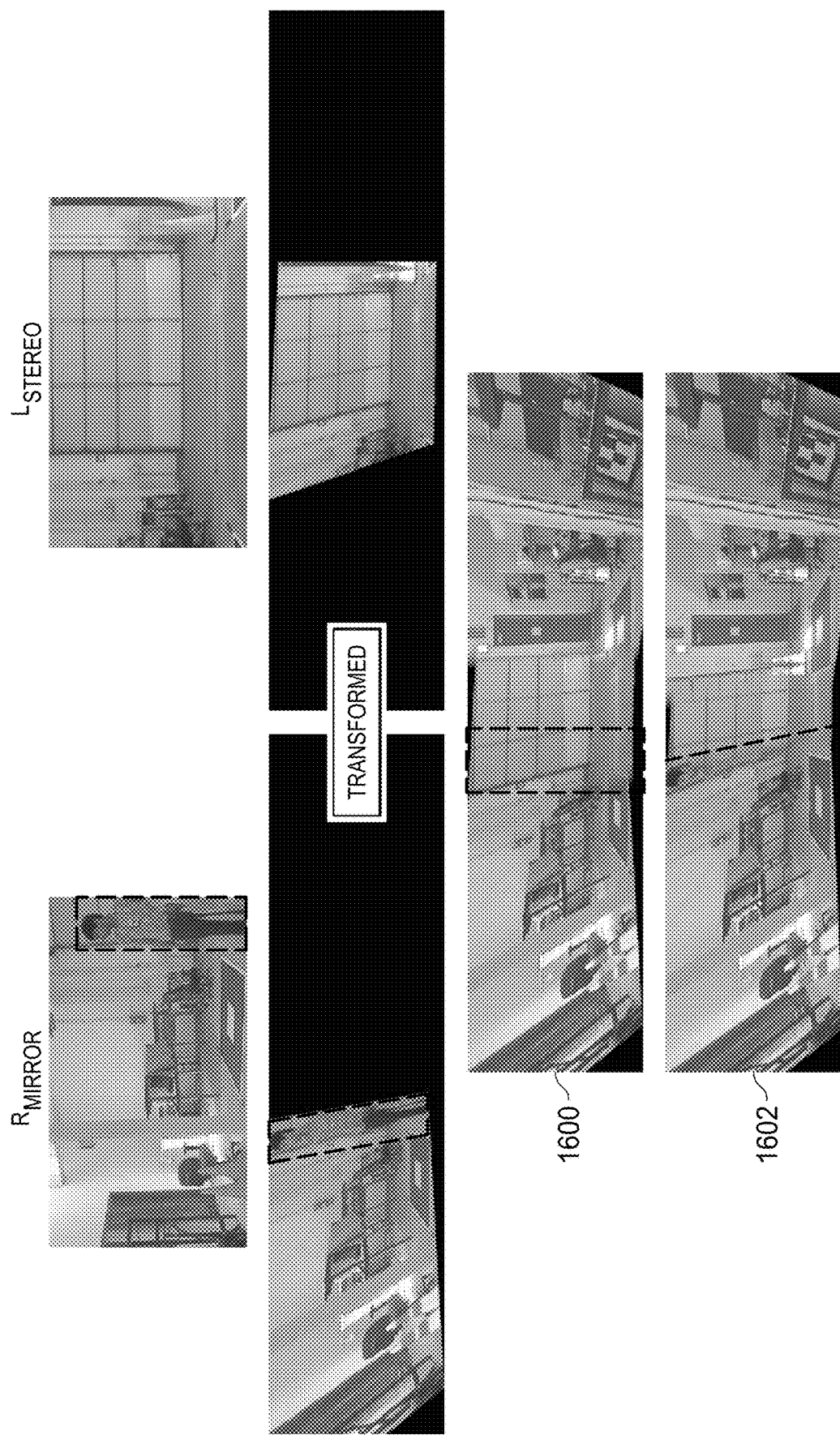
FIG. 16 is an example of an object in one blind zone.

FIG. 16 is an example of an object in blind zone $b_{11}$. The right mirror image $R_{mirror}$ captures a person standing in zone $b_{11}$ who is not visible in the left stereo image $L_{stereo}$. As illustrated in the panorama 1600, the images may be stitched such that the person is not visible. As illustrated in the panorama 1602, if an object detection modality detects the person, then the seam between $R_{mirror}$ and $L_{stereo}$ can be biased away from the person toward the center of the panorama such that at least some of the person is visible in the panorama.

Figure 17:
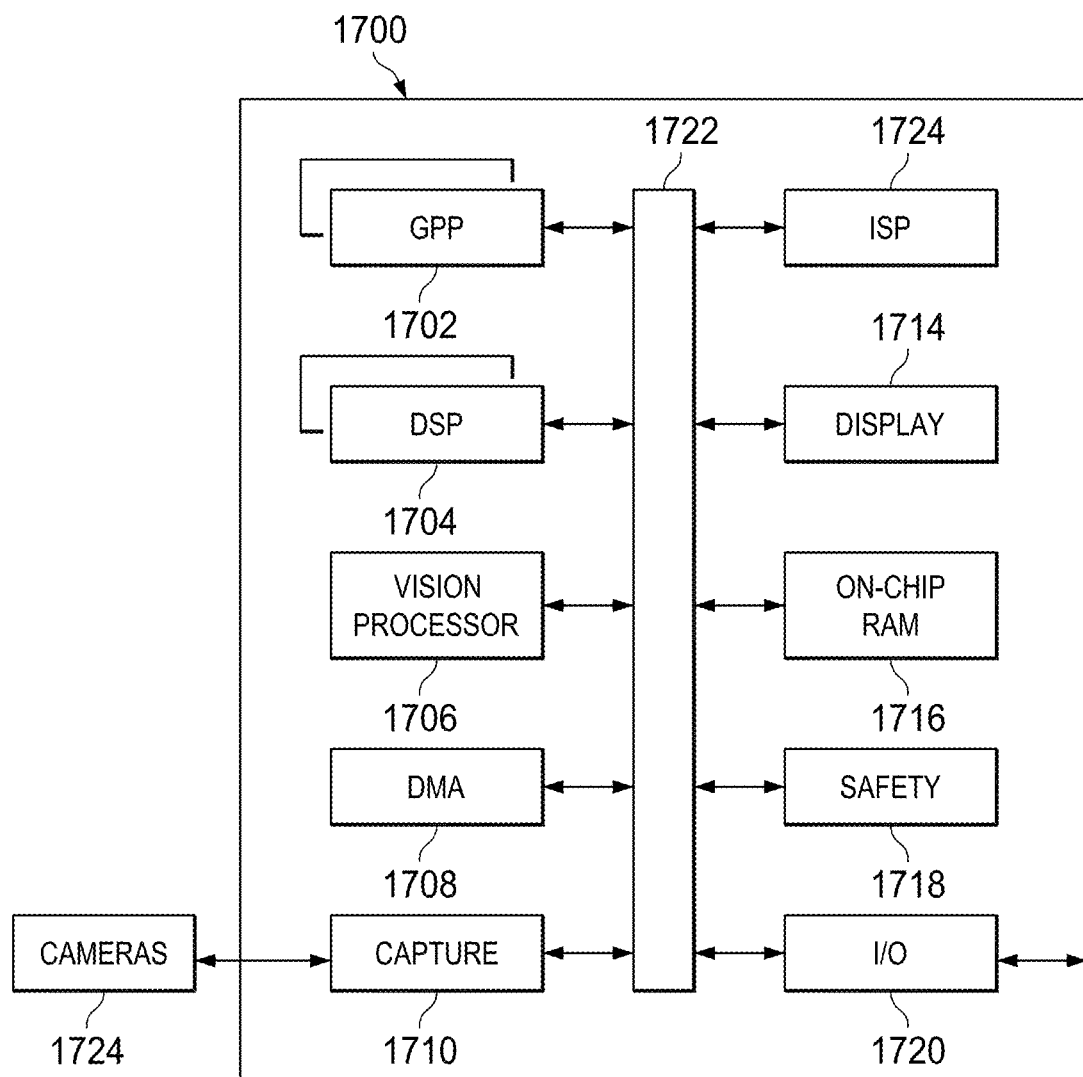
FIG. 17 is a simplified block diagram of a system-on-a-chip (SOC) that may be used in the RSVP system of FIG. 2.

FIG. 17 is a high level block diagram of an example multiprocessor system-on-a-chip (SOC) 1700 that may be used as the SOC 204 of FIG. 2. In particular, the example SOC 1700 is an embodiment of the TDA3X SOC available from Texas Instruments, Inc. A high level description of the components of the SOC 1700 is provided herein. More detailed descriptions of example components may be found in M. Mody, et al., "High Performance Front Camera ADAS Applications on TI's TDA3X Platform," Proceedings of 20117 IEEE 22$^{nd}$ International Conference on High Performance Computing, December 16-19, 20117, Bangalore, India, pp. 4176-463, and "TDA3x SOC Processors for Advanced Driver Assist Systems (ADAS) Technical Brief," Texas Instruments, SPRT704A, October, 2014, pp. 1-6, which are incorporated by reference herein.

The SOC 1700 includes dual general purpose processors (GPP) 1702, dual digital signal processors (DSP) 1704, a vision processor 1706, and an image signal processor (ISP) 1724 coupled via a high speed interconnect 1722. The SOC 1700 further includes a direct memory access (DMA) component 1708, a camera capture component 1710 coupled to external cameras 1724, a display management component 1714, on-chip random access (RAM) memory 1716, e.g., a computer readable medium, and various input/output (I/O) peripherals 1720 all coupled to the processors via the interconnect 1722. In addition, the SOC 1700 includes a safety component 1718 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures. Software instructions implementing an embodiment of rear-view panorama image generation as described herein may be stored in the memory 1716 and may execute on one or more programmable processors of the SOC 1700.

Other Embodiments

While the disclosure has been described with respect to a limited number of embodiments, those skilled in the art, having benefit of this description, will appreciate that other embodiments can be devised which do not depart from the scope disclosed herein.

For example, embodiments have been described herein in which a calibration chart is a composed of a white square positioned in the center of a larger black square which is positioned in the center of a larger white square. One of ordinary skill in the art will understand embodiments in which other suitable calibration charts are used. Some examples of other suitable calibration charts may be found in U.S. Patent Publication No. 2017/0124710 previously cited herein.

In another example, embodiments have been described herein in which the virtual world view is assume to be a flat surface. One of ordinary skill in the art will understand embodiments in which another world representation is used, e.g., a cylindrical surface.

In another example, embodiments have been described herein in which the blending width is predetermined. One of ordinary skill in the art will understand embodiments in which the blending width may be changed dynamically based on knowledge of the scene.

In another example, one of ordinary skill in the art will understand embodiments in which the disparity map used for generating a panorama is the disparity map computed for the previous pair of stereo images.

In another example, embodiments have been described herein in which the cost computation is biased to favor selection of a surface seam over a ground seam. One of ordinary skill in the art will understand embodiments in which the cost computation is biased to select a ground seam.

In another example, one of ordinary skill in the art will understand embodiments in which the virtual camera position may be changed by the driver of a vehicle during operation of the vehicle to adjust the final panorama using a joystick or other input mechanism. In such embodiments, the projective transform parameters are changed responsive to the changes in the virtual camera position.

In another example, embodiments have been described herein in which a coarse-to-fine search is used to locate a minimum cost seam in an overlap region. One of ordinary skill in the art will understand embodiments in which another search approach is used, e.g., search all possible seams in the overlap region.

In another example, embodiments have been described herein in which a single blending LUT of the same size as the panorama is computed and used to stitch the three images together. One of ordinary skill in the art will understand embodiments in which two blending LUTs are generated, one for each overlap region. In such embodiments, pixels in the images not in the overlap regions may be copied to the output panorama and the blending LUTs applied to pixels in the respective overlap regions.

Software instructions implementing all or portions of the methods described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if one device couples to another device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A device configured to:
   receive a first image and a second image;
   compute a disparity map for the first image and the second image;
   receive a third image;
   receive a fourth image;
   transform the third image, the fourth image, a reference image of the first image or the second image, and the disparity map, to generate a transformed third image, a transformed fourth image, a transformed reference image, and a transformed disparity map; and
   compute a seam between the transformed third image and the transformed fourth image in accordance with the transformed disparity map.

2. The device of claim 1, wherein the seam is a first seam, the device further configured to:
   compute a second seam between the transformed third image and the transformed reference image in accordance with the transformed disparity map; and
   generate a panorama in accordance with the transformed fourth image, the transformed reference image, the first seam, the transformed third image, and the second seam.

3. The device of claim 2, wherein generating the panorama comprises:
   stitching the transformed fourth image and the transformed reference image in accordance with the first seam; and
   stitching the transformed third image and the transformed reference image based on the second seam to generate the panorama.

4. The device of claim 2, wherein stitching the transformed fourth image further comprises:
   computing a blending look-up table (LUT) comprising alpha-blending coefficients for combining the transformed fourth image and the transformed reference image; and
   using the blending LUT to stitch the transformed fourth image and the transformed reference image.

5. The device of claim 1, wherein computing the seam further comprises:
   computing a world disparity map;
   computing a world disparity difference map in accordance with the world disparity map and the transformed disparity map;
   computing costs of candidate seams in an overlap region between the transformed fourth image and the transformed reference image, in accordance with the world disparity difference map; and
   searching the candidate seams for a first low cost seam.

6. The device of claim 5, wherein computing the seam further comprises:
   computing a ground plane disparity difference map in accordance with a ground plane disparity map and the transformed disparity map;
   computing second costs of candidate seams in an overlap region between the transformed fourth image and the transformed reference image;
   searching the second costs of candidate seams for a second low cost seam; and
   setting the seam to the lesser of the first low cost seam and the second low cost seam.

7. The device of claim 1, wherein the device is further configured to apply temporal smoothing to the seam, comprising:
   setting the seam to a previous seam upon determining that all pixels in the seam are within a minimum distance threshold of the previous seam; and
   scaling the seam such that a largest pixel displacement between the seam and the previous seam is no larger than a maximum distance threshold upon determining that any pixel in the seam is greater than the maximum distance threshold away from the previous seam.

8. A method comprising:
   receiving, by a device, a first image and a second image;
   computing, by the device, a disparity map for the first image and the second image;
   receiving, by the device, a third image;
   receiving, by the device, a fourth image;
   transforming, by the device, the third image, the fourth image, a reference image of the first image or the second image, and the disparity map, to generate a transformed third image, a transformed fourth image, a transformed reference image, and a transformed disparity map; and computing, by the device, a seam between the transformed third image and the transformed fourth image in accordance with the transformed disparity map.

9. The method of claim 8, wherein the seam is a first seam, the method further comprising:
   computing a second seam between the transformed third image and the transformed reference image in accordance with the transformed disparity map; and
   generating a panorama in accordance with the transformed fourth image, the transformed reference image, the first seam, the transformed third image, and the second seam.

10. The method of claim 9, wherein generating the panorama comprises:
    stitching the transformed fourth image and the transformed reference image in accordance with the first seam; and
    stitching the transformed third image and the transformed reference image based on the second seam to generate the panorama.

11. The method of claim 10, wherein computing the seam further comprises:
    computing a world disparity map;
    computing a world disparity difference map in accordance with the world disparity map and the transformed disparity map;
    computing costs of candidate seams in an overlap region between the transformed fourth image and the transformed reference image, in accordance with the world disparity difference map; and
    searching the candidate seams for a first low cost seam.

12. The method of claim 11, wherein computing the seam further comprises:
    computing a ground plane disparity difference map in accordance with a ground plane disparity map and the transformed disparity map;
    computing second costs of candidate seams in an overlap region between the transformed fourth image and the transformed reference image;
    searching the second costs of candidate seams for a second low cost seam; and
    setting the seam to the lesser of the first low cost seam and the second low cost seam.

13. The method of claim 8, further comprising applying temporal smoothing to the seam, comprising:
    setting the seam to a previous seam upon determining that all pixels in the seam are within a minimum distance threshold of the previous seam; and
    scaling the seam such that a largest pixel displacement between the seam and the previous seam is no larger than a maximum distance threshold upon determining that any pixel in the seam is greater than the maximum distance threshold away from the previous seam.

14. A non-transitory computer readable storage medium storing instructions for execution by at least one processor, to cause the at least one processor to:
    receive a first image and a second image;
    compute a disparity map for the first image and the second image;
    receive a third image;
    receive a fourth image;
    transform the third image, the fourth image, a reference image of the first image or the second image, and the disparity map, to generate a transformed third image, a transformed fourth image, a transformed reference image, and a transformed disparity map; and
    compute a seam between the transformed third image and the transformed fourth image in accordance with the transformed disparity map.

15. The non-transitory computer readable storage medium of claim 14, wherein the seam is a first seam, the instructions further comprising instructions to:
    compute a second seam between the transformed third image and the transformed reference image in accordance with the transformed disparity map; and
    generate a panorama in accordance with the transformed fourth image, the transformed reference image, the first seam, the transformed third image, and the second seam.

16. The non-transitory computer readable storage medium of claim 15, wherein generating the panorama comprises:
    stitching the transformed fourth image and the transformed reference image in accordance with the first seam; and
    stitching the transformed third image and the transformed reference image based on the second seam to generate the panorama.

17. The non-transitory computer readable storage medium of claim 16, wherein stitching the transformed fourth image further comprises:
    computing a blending look-up table (LUT) comprising alpha-blending coefficients for combining the transformed fourth image and the transformed reference image; and
    using the blending LUT to stitch the transformed fourth image and the transformed reference image.

18. The non-transitory computer readable storage medium of claim 14, wherein computing the seam further comprises:
    computing a world disparity map;
    computing a world disparity difference map in accordance with the world disparity map and the transformed disparity map;
    computing costs of candidate seams in an overlap region between the transformed fourth image and the transformed reference image, in accordance with the world disparity difference map; and
    searching the candidate seams for a first low cost seam.

19. The non-transitory computer readable storage medium of claim 18, wherein computing the seam further comprises:
    computing a ground plane disparity difference map in accordance with a ground plane disparity map and the transformed disparity map;
    computing second costs of candidate seams in an overlap region between the transformed fourth image and the transformed reference image;
    searching the second costs of candidate seams for a second low cost seam; and
    setting the seam to the lesser of the first low cost seam and the second low cost seam.

20. The non-transitory computer readable storage medium of claim 14, wherein the instructions comprise further instructions to apply temporal smoothing to the seam, comprising:
    setting the seam to a previous seam upon determining that all pixels in the seam are within a minimum distance threshold of the previous seam; and
    scaling the seam such that a largest pixel displacement between the seam and the previous seam is no larger than a maximum distance threshold upon determining that any pixel in the seam is greater than the maximum distance threshold away from the previous seam.

* * * * *